(12) United States Patent
Dumm (10) Patent No.: US 7,606,878 B2
(45) Date of Patent: Oct. 20, 2009

(54) METHOD AND SYSTEM FOR CAPTURING AND AUTOMATING EXECUTION OF ADMINISTRATIVE PROCESSES IN A MACHINE-READABLE FORMAT

(75) Inventor: Bryan Dumm, Athens, OH (US)

(73) Assignee: BC Publishing, Inc., Athens, OH (US)

( * ) Notice: Subject to any disclaimer, the term of this patent is extended or adjusted under 35 U.S.C. 154(b) by 1038 days.

(21) Appl. No.: 10/804,889

(22) Filed: Mar. 19, 2004

(65) Prior Publication Data

US 2005/0209985 A1 Sep. 22, 2005

(51) Int. Cl.
*G06F 15/177* (2006.01)
(52) U.S. Cl. .................. 709/220; 709/223; 715/704
(58) Field of Classification Search .................. 718/101; 709/223, 220; 715/704
See application file for complete search history.

(56) References Cited

U.S. PATENT DOCUMENTS

| 6,115,646 | A | * | 9/2000 | Fiszman et al. | ............. | 700/181 |
| 6,772,204 | B1 | * | 8/2004 | Hansen | ........................ | 709/220 |
| 7,113,989 | B2 | * | 9/2006 | Murray et al. | .............. | 709/224 |
| 2001/0018710 | A1 | | 8/2001 | Clarke | | |
| 2005/0138557 | A1 | * | 6/2005 | Bolder et al. | ................ | 715/700 |

* cited by examiner

*Primary Examiner*—Li B Zhen
(74) *Attorney, Agent, or Firm*—William L. Botjer (57) ABSTRACT

The present invention provides a method, a system and a computer program product for capturing administrative processes in a machine-readable format, and for automating the execution of the captured administrative processes. An administrative process comprises administrative tasks, which, in turn, comprise administrative commands that need to be performed, to execute the administrative process. All the administrative commands are captured in a machine-readable format using a generic command framework, to form profiles. The execution of the captured administrative processes is automated by performing the following steps: selecting profiles that need to processed for the execution of a selected administrative process; processing the selected profiles; updating the processed profiles; processing the updated profiles again, if required; and selecting and processing additional profiles which need to be processed to execute the selected administrative process.

15 Claims, 4 Drawing Sheets

METHOD AND SYSTEM FOR CAPTURING AND AUTOMATING EXECUTION OF ADMINISTRATIVE PROCESSES IN A MACHINE-READABLE FORMAT

BACKGROUND

The present invention relates to the automation of administrative processes in a local or networked environment. More specifically, the present invention relates to a method and system for capturing administrative processes in a machine-readable format to automate the execution of administrative processes in a local or networked environment.

During the last few years, the complexity of computer networks and the associated administrative processes involved in the management of computer networks has increased significantly. Administrative processes comprise one or more administrative tasks that need to be performed. The increased complexity of the administrative processes has led to an associated increase in the demand for resources, required for the management of the administrative processes.

The resources required to manage the administrative processes of computer networks mainly comprise manpower and material resources. Manpower resources comprise the administrative staff, who are required to define administrative processes and execute them, as and when required. Material resources comprise hardware and software components, involved in the execution of administrative processes.

The increased demand for manpower resources and capital resources has resulted in a significant increase in the costs associated with the management of administrative processes. Although both these costs have increased, the increase in costs associated with manpower resources have been significantly higher compared to that associated with material resources. There are two main reasons for this.

The first reason is the increased complexity of the administrative processes. Due to various factors such as increased threats to system security, increased network size and other problems, the number and complexity of the administrative processes have increased significantly. This has resulted in an enhanced requirement for administrative staff, who are required to create and execute the administrative processes.

The second reason is that the administrative processes are generally not captured in a re-usable format by the administrative staff. A significant amount of knowledge regarding the administrative processes is generally available only to the members of the administrative staff, who create or use the administrative processes. This leads to problems such as non-availability of knowledge about the administrative processes to other staff members for re-use. Further, it may also be possible to modify administrative processes to achieve different objectives. However, if the administrative processes are not available in a proper re-usable format, it may not be possible to extend the use of these administrative processes to achieve different objectives.

A solution for this is to capture all administrative processes in a re-usable format. Further, the selection and execution of the captured administrative processes can also be automated to a considerable extent. This can lead to a significant reduction in the costs associated with the management of administrative processes. Several attempts have been made to create methods and systems, which can be used to capture the administrative processes.

WIPO patent publication WO0235315A2, titled "Remote Network Management Software", describes one such system and method for managing networks remotely. This is achieved by installing distributed software agents in the remote components being managed. The publication discloses an extensible framework that comprises a software component framework to update and manage remote network services. This framework is implemented via Extensible Mark-up Language (XML), or any other Standard Generalized Mark-up Language (SGML).

U.S. Pat. No. 6,115,646, titled "Dynamic And Generic Process Automation System", describes a system that provides workflow management services in a heterogeneous distributed computing environment. This invention decouples process definitions, run-time process management and process execution agents to create an object-oriented process automation engine.

U.S. patent application US20010018710, titled "System and Method for Improved Automation of a Computer Network", describes a system and method for controlling the automation process in a computer network. This is achieved by the introduction of an abstract resource model, which comprises an automation decision-making component and an automation-execution component.

There are certain limitations associated with the use of the above-mentioned methods and systems. These methods and systems do not achieve the automation of administrative processes in a computer system by capturing the administrative commands in a machine-readable format. Hence, they do not facilitate the usage of the captured commands for multiple uses.

Further, the above-mentioned methods and systems use different frameworks to capture different administrative commands. The use of various frameworks to capture different administrative commands significantly increases the complexity involved in the use of these methods and systems.

Hence, there exists a need for a method and system that can be used to capture the administrative processes in a re-usable format, by using a generic framework to capture the administrative commands. Further, the method and system should also be capable of automating the execution of the captured administrative processes.

SUMMARY

In accordance with one aspect, the present invention provides a method for capturing administrative processes in a machine-readable format. The administrative processes comprise one or more administrative tasks that have to be performed to execute the processes. Each administrative task has an objective and is defined by one or more administrative commands that need to be executed by system elements to achieve the objective of the administrative task. An administrative command is a machine-understandable instruction, which causes a processing machine to perform an operation, as specified by the command. Examples of administrative commands comprise shell commands (e.g., <mkdir>), as well as other commands such as system commands. A system command is an administrator's instruction (not a part of a program) that calls for some action by the processing machine's executive program (a program that controls the execution of other programs).

A generic command framework is created to capture the structures of all types of administrative commands used in the administrative process. The administrative commands are captured by writing them in a machine-readable format, in accordance with the generic command framework. Captured administrative commands that define an administrative task are written in a machine-readable format in a document, to generate a profile. Network maps, which comprise the details of one or more servers in a networked environment, are also generated. Administrative lists are generated by combining profiles that define the administrative tasks, which constitute an administrative process. In this manner, each administrative list captures an administrative process in a machine-readable format.

In accordance with another aspect, the present invention provides a method for capturing administrative processes in a machine-readable format, and further automating the execution of the captured administrative processes. A first set of administrative lists is selected based on the administrative process to be executed. The profiles contained in the selected administrative list are then processed to perform the desired administrative tasks that constitute the administrative process.

The processing of a profile comprises the steps involved in parsing the profile to generate events; executing the generated events by using administered components; collecting messages generated by the administered components in response to the executed events; updating the selected profiles, based on the collected messages; processing the updated profiles again, if required; and selecting new profiles for processing, based on the results of execution of the previously processed profiles. The selection and processing of profiles in this manner leads to the execution of the administrative process.

In accordance with another aspect, the present invention provides a system for capturing administrative processes in a machine-readable format, and further automating the execution of the captured administrative processes. The system comprises a profile generator to generate profiles; a network map generator to generate network maps; an administrative list generator to generate administrative lists from profiles and network maps; a front end; and a back end. The front end enables at least one function from among the various functions involved in the selection of profiles contained in administrative lists, reading the selected profiles, and transforming them. The back-end comprises an event-driven machine to process the selected profiles, which have been written in a structured mark-up language; and one or more controllers to connect the front-end to the event-drive machine to process profiles.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention presents a method and system for capturing administrative processes in a machine-readable format. The present invention also presents a method and a system for capturing the administrative processes in a machine-readable format, and further automating the execution of the captured administrative processes.

An administrative process comprises one or more administrative tasks, which need to be performed in a pre-defined order, to execute the administrative process.

The administrative tasks comprise one or more administrative commands. These administrative commands when executed in a pre-defined order, lead to the accomplishment of the administrative task. Each administrative command is a machine-understandable instruction that causes a processing machine to perform an operation. The processing machine can be a general-purpose computing device, a programmed microprocessor, a micro-controller, an integrated circuit element or other devices or arrangements of devices, which are capable of executing the administrative commands that comprise the administrative task. Further, combinations of one or more processing machines can also be involved in executing administrative commands.

An administrative process can be captured in a machine-readable format by capturing the constituent administrative tasks. In turn, the administrative tasks can be captured in the machine-readable format by capturing the constituent administrative commands in the machine-readable format.

Administrative commands may be commands that are manually entered by an administrator, or the commands that are automatically generated by a system. Further, the manually-entered or system-generated administrative commands can be of two types—shell commands and system commands. A shell command is a command entered in a shell to accomplish an administrative task. A shell is a command interpreter that provides an interactive user interface with an operating system, and is the layer of programming that understands and executes the commands a user enters. A system command is an administrator's instruction (not part of a program) that calls for action by the processing machine's executive program (a program that controls the execution of other programs).

For example, editing a configuration file can be an administrative task. All system-generated and administrator-generated administrative commands that are required to be processed, in order to edit the configuration file, will be captured in a machine-readable format.

A generic command framework can be used to capture the administrative commands in a machine-readable format using a structured mark up language. The generic command framework defines a set of rules, based on which the different structural elements of an administrative command are expressed in a machine-readable format. The structural elements of an administrative command comprise command name, shell-related information, command parameters and command flags. All these structural elements can be captured in accordance with the generic command framework, as described in the present invention. Any structured mark up language can be used to design and implement such a generic command framework for capturing the administrative commands.

Further, multiple command frameworks can be used for capturing different types of administrative commands. However, the use of multiple command frameworks adds to the complexity involved in the process of capturing the administrative commands in a machine-readable format. Therefore, in one embodiment of the present invention, only one generic command framework is used for capturing the administrative commands in a machine-readable format. The generic command framework specifies the following rules (fields) for capturing the different elements of an administrative command <command name="abc"> captures the name of the typed command and changes accordingly with different commands.

<shell> captures elements that express shell ideas such as path information.

<param> captures the parameters a command needs. A parameter can be specified by using a name="abc" format. For example, in the profile given above, <amin:param name="target"> specifies the location where a new directory should be created.

<flag> captures the flags of an administrative command. Flags represent the additional information that is required to be given with a command. For example, the mode (which is an octal value, like 0755) of an administrative command like "mkdir" needs to be specified by a user. In accordance with the generic command framework, this information can be captured as <flag name="mode">0755</flag>.

Although a single generic command framework has been used for capturing the administrative commands in this embodiment, it will be apparent to a person skilled in the art that multiple generic command frameworks can also be used to capture different types of administrative commands in a machine-readable format.

Figure 1:
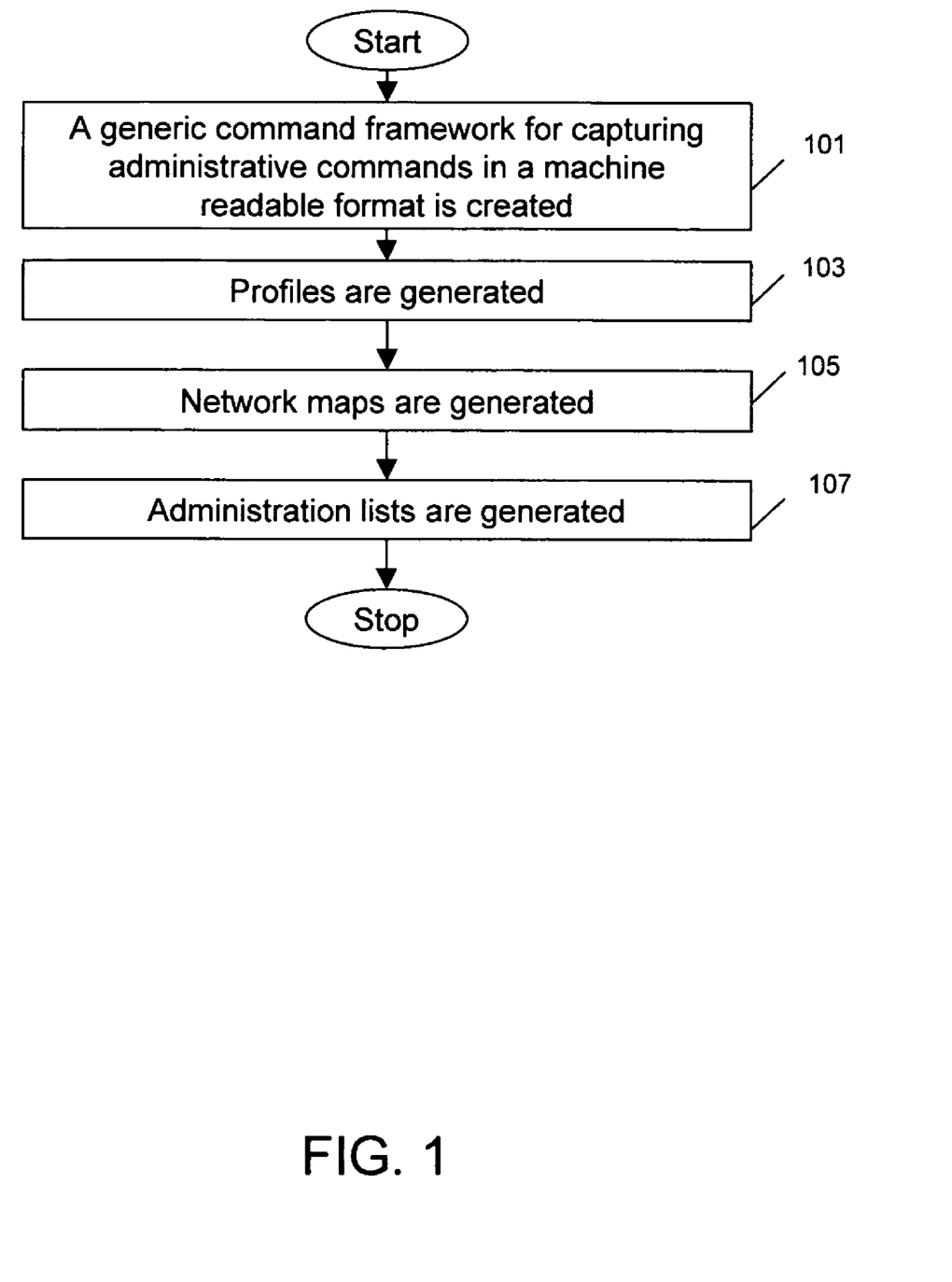
FIG. 1 illustrates a method for capturing administrative processes in a machine-readable format, in accordance with one embodiment of the present invention.

FIG. 1 illustrates a method for capturing administrative processes in a machine-readable format, in accordance with one embodiment of the present invention.

At step 101, a generic command framework is created to capture administrative commands in a machine-readable format. The administrative commands when expressed in a machine-readable format, in accordance with the generic command framework, are called captured administrative commands.

In one embodiment of the present invention, Extensible Mark up Language (XML) is used to design and implement the machine-readable format. This means that all administrative commands are expressed in a machine-readable format using XML.

For example, when an administrative command such as cd /tmp mkdir -m 0754 test_dir test_dir2 is typed in a linux shell, it is captured in a machine-readable format using XML as follows:

```
<amin:command name="mkdir">
    <amin:param name="target">test_dir test_dir2</amin:param>
    <amin:flag name="mode">0754</amin:flag>
    <amin:shell name="dir">/tmp</amin:shell>
</amin:command>
```

In this manner, by capturing administrative commands in a generic command framework, the present invention allows the separation of choices (administrative commands, data, decisions) from processes (the shell, user interface, back-end processing). This separation enables capturing administrative processes in a machine-readable format. This can then be used to automate execution of the captured administrative processes.

In one embodiment of the present invention, namespaces are incorporated into profiles to add additional metadata to the profiles. An XML namespace is a collection of names, identified by a URL reference, which are used in XML documents as element types and names. Namespaces are created and used to prevent element names from clashing in two or more XML syntax definitions. Hence, administrators can add additional metadata to the profiles using their own namespaces without affecting the already existing namespaces.

At step 103, profiles are generated by combining all the captured administrative commands that define an administrative task. Hence, a profile is a machine-readable version of an administrative task, and comprises captured administrative commands, which when executed lead to the accomplishment of the objective of the administrative task.

At step 105, one or more network maps are generated. Each network map comprises details of network servers on which one or more administrative commands, which constitute an administrative task, need to be performed. A network map can be a security network map, a webserver network map, a database network map, or an entire network map containing details of all the servers employed in the network.

At step 107, administrative lists are generated for each administrative process that has to be executed. Each administrative list corresponds to an administrative process, and comprises one or more profiles, which define the administrative tasks that constitute the administrative process. A predefined order according to which administrative tasks need to be executed is also provided in the administrative list. Hence, an administrative list represents an administrative process in a structured machine-readable format. An administrative list can also comprise one or more network maps and associations between the network maps(s) and the profiles contained in the administrative list. The association between a network map and a profile defines the server(s) on which each administrative command in the profile has to be executed.

In one embodiment of the present invention, the profiles, network maps and administrative lists are captured in a machine-readable format using XML.

Figure 2A:
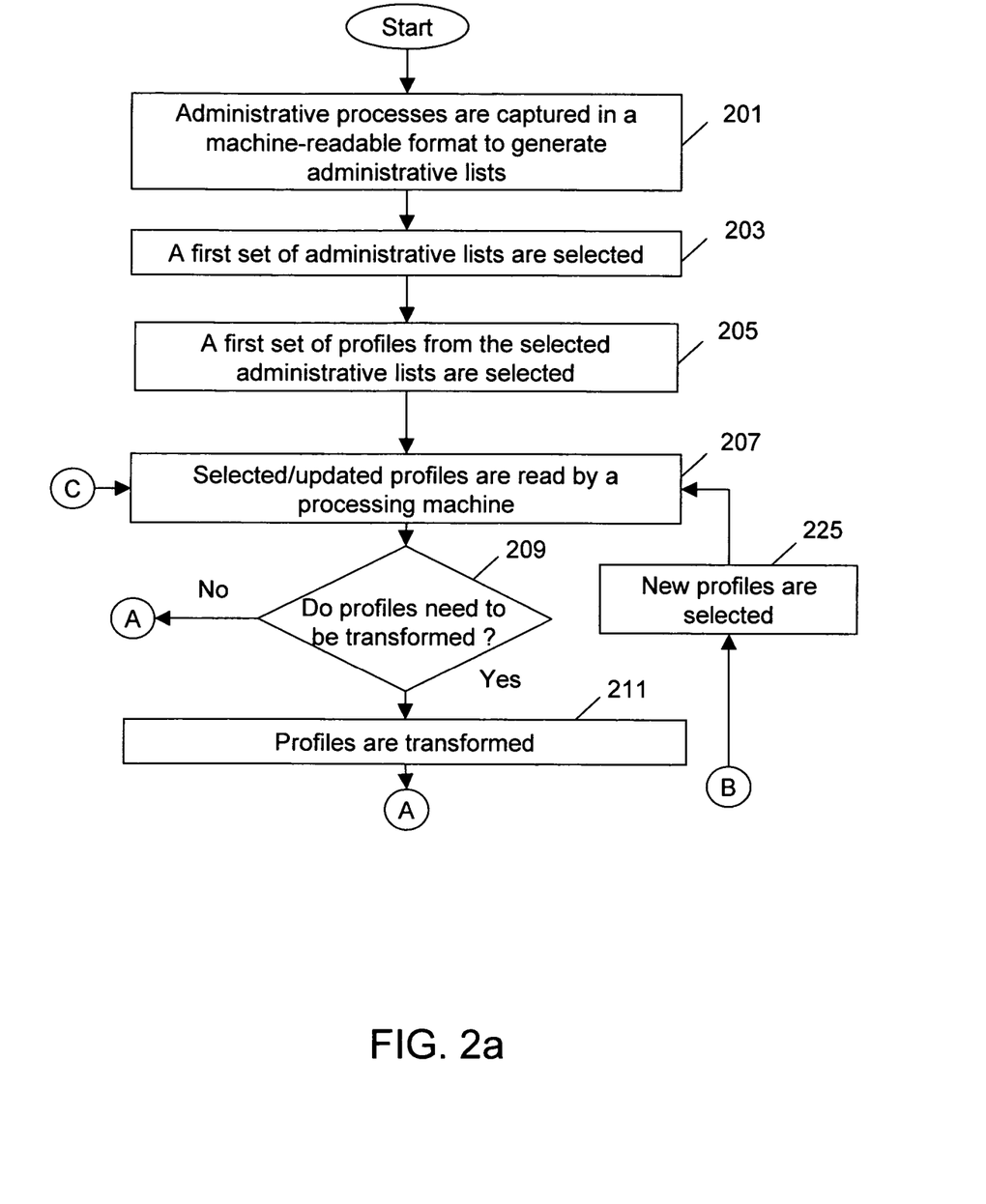
FIG. 2 illustrates a method for capturing administrative processes and automating the execution of the captured administrative processes, in accordance with one embodiment of the present invention.
Figure 2B:
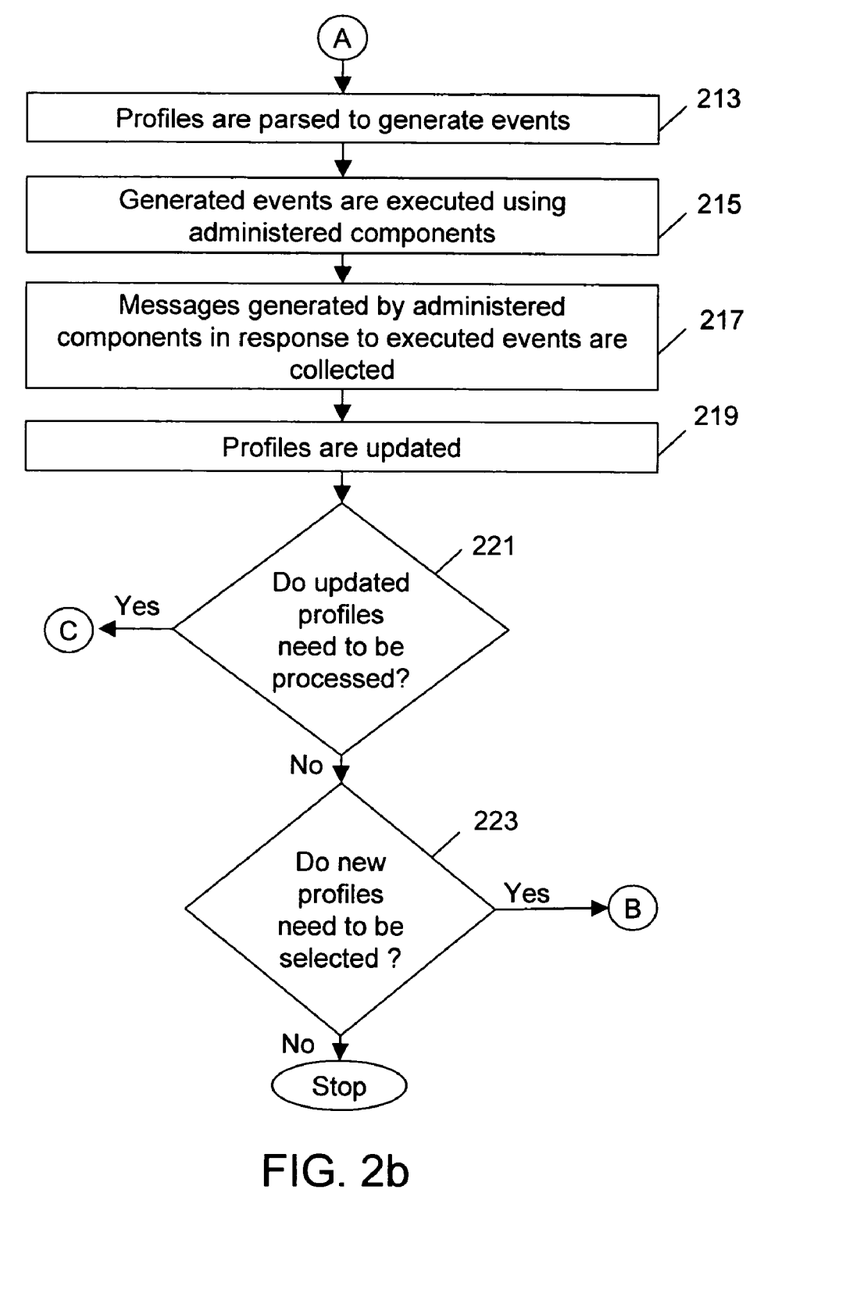

FIG. 2 describes a method for capturing the administrative processes and automating the execution of the captured administrative processes, in accordance with one embodiment of the present invention.

At step 201, administrative processes are captured in a machine-readable format. The method of capturing the administrative processes has been explained in detail earlier, with reference to FIG. 1.

At step 203, the first set of administrative lists is selected, depending on the administrative process to be performed. The selection of the first set of administrative lists can be performed manually by an administrator or automatically. Automatic selection is based on a set of pre-defined administrative list selection rules. These rules define the manner in which administrative lists need to be selected based on the messages received from the administered network. Hence, an administrative list can be selected for processing by an administrator, or it can be selected automatically by the processing machine, using a script containing a pre-defined set of rules specified by the administrator.

At step 205, the first profile contained in the selected administrative list is selected.

At step 207, the selected profile is read by a processing machine.

At step 209, it is determined whether the read profile needs to be transformed or not. The profile transformation process involves changing the profiles from a first machine-readable format to a second machine-readable format. The determination of the need to transform profiles is based on a set of pre-defined transformation rules.

The transformation rules may be stored locally in the system or network being administered, or they can be stored outside it. For instance, consider a case where a local area network (LAN) is being administered. In such a case, the transformation rules may be stored in a document that is stored in the LAN or at some external Uniform Resource Locator (URL) in an external network, such as the Internet. When the document containing the transformation rules is stored at an external URL, references to the URL can be used to access the transformation rules.

In one embodiment of the present invention, profiles are generated using XML. In this embodiment, the transformation of profiles involves converting an XML profile into a second XML profile. Transformations can be performed using various available XML transformation languages such as XSLT (Extensible Style Sheet Transformation) for transforming XML documents from one form to another.

As determined at step 209, if the read profiles need to be transformed, step 211 is performed. At step 211, the selected profiles are transformed from a first machine-readable format to a second machine-readable format and step 213 is performed.

At step 213, the transformed profiles are parsed to generate events.

As determined at step 209, if the read profiles do not need to be transformed, step 213 is performed. At step 213, the read profiles are parsed to generate events.

Once the transformed/read profiles are parsed, the generated events are directed to appropriate administered components for execution. Administered components comprise devices and components (software modules and system commands) whose administration needs to be automated. Examples of administered components include network devices such as routers and packet shapers, software programs and system commands for accomplishing administrative tasks.

It will be apparent to a person skilled in the art that administered components are not limited to the above-mentioned examples. Any component, which is required to execute an event generated after parsing of the profile, will comprise administered components in the environment of the present invention.

At step 215, the generated events are executed using the administered components.

Control messages such as "success", "error" or "not processed" are generated by the administered components in response to the executed events. Some system messages such as stdOUT or stdERR may also be generated. These system messages are the standard messages generated by shell components in response to the processing of any shell command. The messages provide metadata regarding the executed events.

At step 217, all the control messages corresponding to the parsed profile are collected. At step 219, the parsed profile is updated, based on the collected messages.

In one embodiment of the present invention, a parsed profile is updated by appending the collected messages (corresponding to the parsed profile) to the parsed profile. For example, consider a profile given below to create a directory:

```
<amin:command name="mkdir">
    <amin:param name="target">test_dir test_dir2</amin:param>
    <amin:flag name="mode">0754</amin:flag>
    <amin:shell name="dir">/tmp</amin:shell>
</amin:command>
<amin:command name="mkdir">
    <amin:param name="target">/tmp/test_dir3</amin:param>
    <amin:flag name="mode">0755</amin:flag>
</amin:command>
```

After this profile is has been parsed and is appended with the collected messages, the updated profile would appear as follows:

```
<amin:command name='mkdir'>
    <amin:param name='target'>test_dir test_dir2</amin:param>
    <amin:flag name='mode'>0754</amin:flag>
    <amin:shell name='dir'>/tmp</amin:shell>
    <amin:message type='success'>Making directories in /tmp (perm: =0754):test_dir, test_dir2</amin:message></amin:command>
    <amin:command name='mkdir'>
    <amin:param name='target'>/tmp/test_dir3</amin:param>
    <amin:flag name='mode'>0755</amin:flag>
    <amin:message type='success'>Making directories in (perm: =0755):/tmp/test_dir3</amin:message></amin:command>
```

The appended message "success" signifies that the directory has been created successfully.

After the profile has been updated at step 219, step 221 is performed. At step 221, it is determined whether the updated profile needs to be processed again. This determination is based on the messages contained in the updated profile and the administrative task to be performed.

For example, consider a case when a profile for creating a directory is processed and appended with messages generated by the administered components. The updated profile appears as follows:

```
<amin:command name='mkdir'>
    <amin:param name='target'>test_dir</amin:param>
    <amin:flag name='mode'>0754</amin:flag>
    <amin:shell name='dir'>/tmp</amin:shell>
    <amin:message type='success'>
    Making directories in /tmp (perm: =0754):test_dir
    </amin:message>
</amin:command>
<amin:command name='mkdir'>
    <amin:param name='target'>test_dir2</amin:param>
    <amin:flag name='mode'>0754</amin:flag>
    <amin:shell name='dir'>/tmp</amin:shell>
    <amin:message type='error'>
        Directory test_dir2 exists
    </amin:message>
</amin:command>
<amin:command name='mkdir'>
    <amin:param name='target'>/tmp/test_dir3</amin:param>
    <amin:flag name='mode'>0755</amin:flag>
    <amin:message type='not processed'>
        This element was not processed
    </amin:message>
</amin:command>
```

The appended messages <'success'>, <'error'> and <'not processed'> signify that one command in the profile was successful, one indicated an error, and one was not processed. Based on the messages appended to the commands in the profile, the processing machine decides whether the profile needs to be re-processed. For example, if the messages appended to all executed commands in the processed profile are <'success'>, then the processing machine decides that the profile does not need to be processed again. However, in case there is an <'error'> or a <'not processed'> message appended to any of the commands in the profile, the processing machine decides to process the profile again.

If the updated profile needs to be processed again, it is selected for processing, and steps 207-219 are performed for it.

However, as determined at step 221, if the updated profile does not need to be processed again, step 223 is performed. At step 223, it is determined whether the selected administrative list contains any more unprocessed profiles.

If the selected administrative list contains other profiles, which have not been processed, step 225 is performed. At step 225, the next unprocessed profile contained in the selected administrative list is selected and steps 207-219 are performed for the newly selected profile.

In this manner, the automated selection and processing of administrative lists and the constituent profiles leads to the automated execution of the administrative processes.

Figure 3:
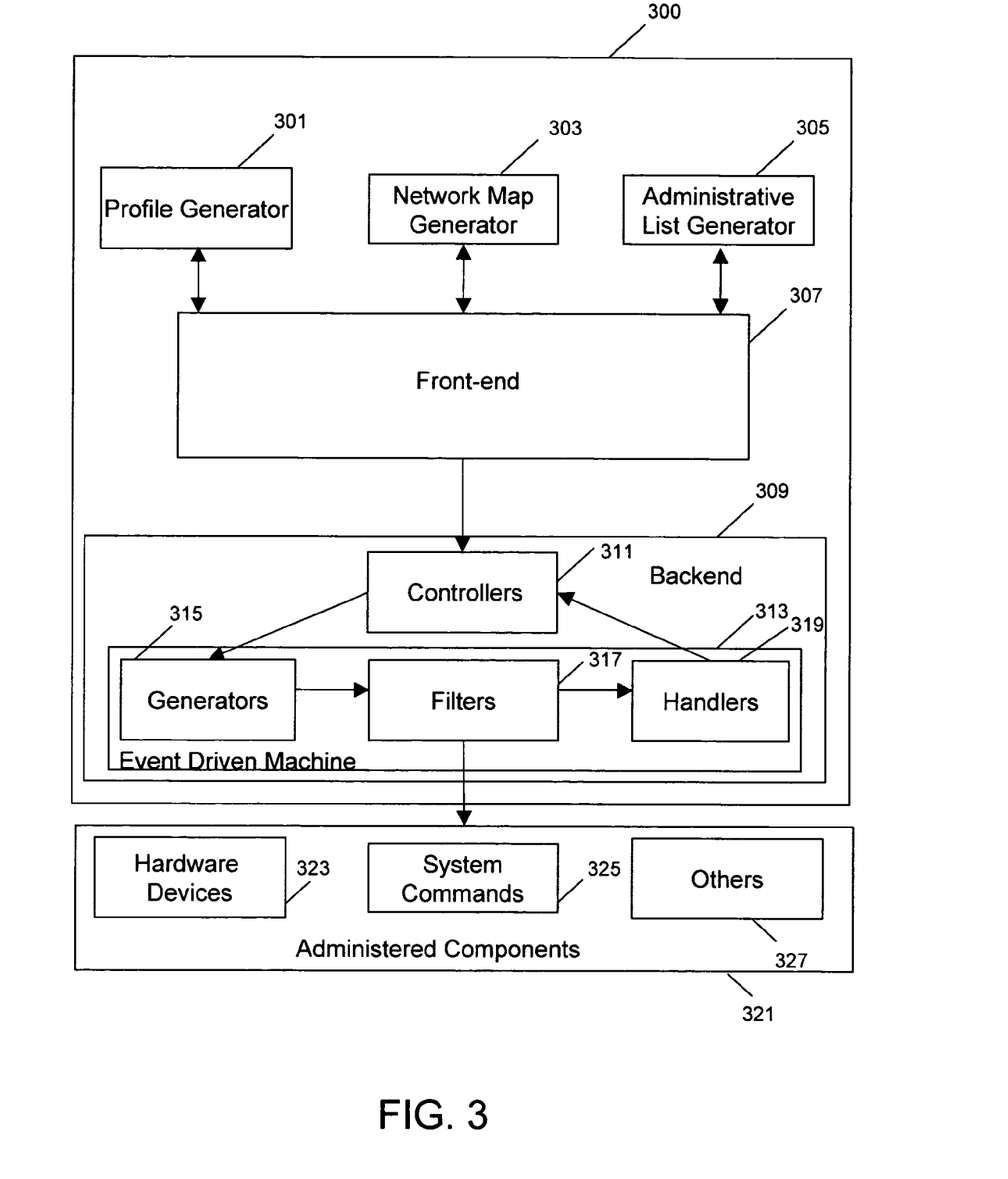
FIG. 3 illustrates the environment in which the system for capturing the administrative processes and automating the execution of the captured administrative processes of the present invention works, in accordance with one embodiment of the present invention.

FIG. 3 illustrates the environment, in which the system for capturing the administrative processes and automating the execution of the captured administrative processes of the present invention works, in accordance with one embodiment of the present invention.

System 300 comprises a Profile Generator 301, a Network Map Generator 303, an Administrative List Generator 305, a Front-end 307, and a Back-end 309.

Profile Generator 301 is a software module that captures all administrative commands that constitute an administrative task, using a generic command framework. Profile Generator 301 captures all the administrative commands, including the manually entered and the automatically generated administrative commands, in the form of profiles. For example, when a shell command for creating a directory is entered, Profile Generator 301 captures the command using a generic command framework. All administrative commands typed in a normal shell have features such as name, flags, parameters, and other shell concepts like path information, associated with them. All these features of administrative commands are captured in accordance with the generic command framework described in the present invention.

In one embodiment of the present invention, a structured mark-up language such as XML is used to capture administrative commands in a machine-readable format. The following illustration presents an example of how Profile Generator 317 captures administrative commands in the form of profiles.

When the following administrative command is typed in a Linux shell, cd /tmp mkdir -m 0754 test_dir test_dir2

Profile Generator 317 captures it in a generic command framework, using XML, as

```
<amin:command name="mkdir">
    <amin:param name="target">test_dir test_dir2</amin:param>
    <amin:flag name="mode">0754</amin:flag>
    <amin:shell name="dir">/tmp</amin:shell>
</amin:command>
```

Network Map Generator 303 is a software module that generates network maps. A network map comprises details of network servers on which one or more administrative commands, which constitute an administrative task, need to be performed. In one embodiment of the present invention, Network Map Generator 303 generates network maps by recording the names and IP addresses of all servers that are involved in processing the given administrative commands. A network map containing details of two servers named "jerry" and "mickey" is given here as an example.

```
<amin:network xmlns:amin="http://projectamin.org/ns/">
    <amin:server name="jerry">
        <amin:ip>206.183.254.10</amin:ip>
```

-continued

```
        <amin:port>2034</amin:port>
    </amin:server>
    <amin:server name="mickey">
        <amin:ip>206.183.254.51</amin:ip>
        <amin:port>3532</amin:port>
    </amin:server>
</amin:network>
```

Administrative List Generator 305 is a software module that generates administrative lists for each administrative process that has to be executed. Each administrative list corresponds to an administrative process and comprises profiles that define the administrative tasks that constitute the administrative process. A pre-defined order in which administrative tasks need to be executed in order to execute the administrative process is also provided in the administrative list. Hence, an administrative list represents an administrative process in a structured machine-readable format. An administrative list can also comprise associations between the constituent profiles and one or more network maps.

Front-end 307 comprises one or more user interfaces, which enable the interaction of a user with system 300. Examples of user interfaces include a graphical user interface (GUI), a web user interface, or other types of interfaces such as command-line user interfaces. Front-end 307 enables users to select administrative lists, profiles and network maps, depending on the administrative process to be performed. In a fully automated system, Front-end 307 performs such selection of administrative lists automatically in response to a system requirement, without any user intervention. Front-end 307 reads the selected profiles and passes the read profiles to back-end 309 for processing.

In one embodiment of the present invention, Front-end 307 can also perform transformations. Transformations involve the conversion of profiles from a first machine-readable format to a second machine-readable format.

Transformations can be of two types—conditional transformations and global transformations. Conditional transformations involve the selective transformation of the read profiles that meet a set of pre-defined transformation conditions. Global transformations involve the unconditional transformation of all read profiles. Front-end 307 generally performs transformations where conditional transformations are involved.

For example, consider a profile for building a software which contains the hard coded location of the source code for that software. Following is an example of such a profile, generated by using XML:

```
<amin:command name="unpack">
    <amin:param name="target">/usr/src</amin:param>
    <amin:param name="archive">/dir-sources/33/
        bash-2.05b.tar.gz</amin:param>
</amin:command>.
```

Now assume that the source code for building the software is put in /my/archive instead of in /dir-sources/33/ as specified in the above-mentioned profile. In such a case, a transformation would be required to correct the location of the source code in the profile. However, there might be another profile in which the new source code location (/my/archive) is specified. Therefore, this profile does not need to be transformed.

This presents an example of a conditional transformation, wherein one profile needs to be transformed while the other does not. Therefore, Front-end 307 will perform this transformation.

In accordance with one embodiment of the present invention, such transformations are performed in accordance with the rules defined by the use of XML transformation languages such as XSLT.

Back-end 309 comprises one or more Controllers 311 and an event-driven machine 313 for processing the selected profiles. The choice of event-driven machine 313 depends on the machine-readable format in which the profiles have been expressed.

Event-driven machine 313 comprises one or more Generators 315, one or more Filters 317, and one or more Handlers 319.

In one embodiment of the present invention, the administrative processes are captured using XML. In this embodiment, event-driven machine 313 is a SAX (Simple API for XML) machine. A SAX machine is an advanced way of putting together SAX processing pieces (generators, filters and handlers) and controlling the flow of information among them. A SAX machine is a common parser interface for XML parsers. It allows application writers to write applications that use XML parsers but are independent of the parser that is actually used for parsing.

Controllers 311 act as a bridge between Front-end 307 and event-driven machine 319 by passing the profiles read by Front-end 307 to Generators 315. Controllers 311 also passes back the updated profiles handed to it by Handlers 319 to Front-end 307. Controllers 311 are also responsible for setting up event-driven machine 313 in a flexible user-defined manner. The manner in which controllers are designed depends on the type of Front-end 307 connected to the back-end 309.

In accordance with one embodiment of the present invention, controllers 311 can also perform profile transformations. Controllers 311 are generally involved in performing global transformations. That is, Controllers 311 generally perform transformations when a global set of rules needs to be enforced on all profiles, which are sent to Controllers 311 by Front-end 307.

Generators 315 are components that generate a series of events as they read the profiles passed to them by Controllers 311. In one embodiment of the present invention, Generators 315 are XML parsers. XML parsers can be based on the push parsing/event-based parsing model. In this model, the parser breaks down XML documents into identifiable pieces and sends notifications regarding these pieces to different applications. The notifications are sent in "reading" order, that is, as they appear in the text of the parsed document.

In another embodiment of the present invention, Generators 315 can read profile-related data from a datasource and generate events by processing the profile-related data. The datasource may be a database, an ldap server or other such datasources, which can store the profile-related data, which is to be read by Generators 315. For example, in one embodiment of the present invention, Generators 315 can read event-related data from a perl data structure and process it to generate events.

It would be apparent to a person skilled in the art that Generators 315 of the present invention are not limited to reading profile-related data from a perl datastructure. Generators 315 can read and process profile-related data, stored in any type of data structure.

The generated events are directed to Filters 317. Filters 317 are software modules that directly interact with administered components 321, and direct the generated events to be executed to appropriate administered components 321.

Administered components 321 comprise hardware devices 323, system commands 325, and other components 327, which are used to execute the generated events. Examples of other administered components comprise software programs such as web servers and database servers, service monitoring programs, IDS systems, backup programs, and other such components, that administrators need to interact with to perform administrative tasks.

The generated events are executed at administered components 321, to which they are directed. Administered components 321 generate messages in response to the execution of the generated events.

Once the events are executed, Filters 317 collect the messages generated by administered components 321 in response to the execution of each event.

Filters 317 then pass the messages corresponding to each executed event to Handlers 319. Filters 317 may pass all the messages, or they may filter these messages and pass only some of the messages, to Handlers 319. Further, Filters 317 may also modify some of the messages before these messages are passed to Handlers 319. In one embodiment of the present invention, Filters 317 are SAX filters. As known in the art, SAX filters can be designed to incorporate different message filtering rules. For example, Filters 317 can block all messages, or let all messages pass to other system modules. They can also be designed to add or remove an attribute from the messages before passing them to other system modules.

In one embodiment, Handlers 319 are XML writers that append the collected messages to the parsed profiles. The parsed profiles that have been appended with the messages (generated In response to the execution of the events contained in the profile) are called updated profiles. Handlers 319 further pass the updated profiles back to Controllers 311, which in turn pass them to Front-end 307.

In this manner, the system of the present invention enables the execution of the captured administrative processes.

An advantage offered by the present invention is that it uses a generic command framework to capture all administrative commands. It does not use different command frameworks to capture different administrative commands. This significantly reduces the complexity involved in the process of capturing administrative commands and automating the execution of the administrative processes.

In one embodiment of the present invention, the system and method described in the present invention are used to build a Security Manager application to manage the security levels of a network. The Security Manager application generates administrative lists, profiles and network maps to manage security or firewall levels of the network. For example, the Security Manager application may generate administrative lists comprising an attack administrative list, an all-clear administrative list, and a closed administrative list. Each of these administrative lists comprises profiles containing administrative commands that change the firewall for the network, bringing it to an appropriate security level. When the security of the network is threatened, an Intrusion Detection System (IDS) installed in the network causes a script to be run. The script causes the Security Manager application to select and run the attack administrative list. The attack administrative list comprises the attack.xml profile and the entire-network map. Hence, the attack.xml profile is sent to each firewall server listed in the entire-network map. The execution of this profile upgrades the security level of the network to a level higher than the original security level.

The IDS continues to run appropriate scripts in response to the security requirements of the network, and causes the Security Manager to select other administrative lists. For example, if the attack escalates, the Security Manager selects and runs the closed administrative list containing the closed.xml profile, which, when executed on the firewall servers in the network, shuts down the entire network. Hence, in this embodiment, no human intervention is needed and the security problem of the network is administered by the present invention in an automated manner.

The present invention may also be embodied in a computer program product for use with a computer. The computer program product includes a computer usable medium having a computer readable program code embodied therein.

While the various embodiments of the invention have been illustrated and described, it will be clear that the present invention is not limited to these embodiments only. Numerous modifications, changes, variations, substitutions and equivalents will be apparent to those skilled in the art, without departing from the spirit and scope of the invention as described in the claims.

What is claimed is:

1. A method for capturing administrative processes in a machine-readable format, the administrative processes being processes that need to be implemented by an administrator for achieving different objectives in a local or a networked environment, the administrative processes comprising administrative tasks and the administrative tasks comprising administrative commands, the method comprising the steps of:
   a. creating a generic command framework in a machine-readable format to capture administrative commands used in the administrative processes by capturing structures of all types of the administrative commands, wherein the structures of all types of the administrative commands are captured by writing the administrative commands in the machine-readable format in accordance with the generic command framework;
   b. generating profiles that define the administrative tasks, the profiles are generated by combining all the captured administrative commands in the machine-readable format, the profiles being collections of the captured administrative commands that define an administrative task, the profiles are generated by a profile generator, and the profiles being the machine-readable version of the administrative tasks, wherein the captured administrative commands when executed accomplish the administrative task;
   c. generating network maps, each network map comprising details of one or more servers in the networked environment on which the administrative tasks defined by the profiles need to be performed, the network maps are generated by a network map generator;
   d. generating admin lists by combining one or more profiles that define administrative tasks, which constitute an administrative process, wherein the admin lists comprise a pre-defined order in which the administrative tasks need to be executed, the admin lists are generated by an admin list generator, wherein each admin list captures the administrative process in a machine-readable format, which is processed for automating execution of the administrative process;
   e. enabling selection of the one or more profiles contained in the admin lists by using at least one function from a plurality of functions;
   f. transforming the selected profiles from a first machine-readable format to a second-machine readable format based on a predefined rule; and
   g. processing the selected profiles written in the machine-readable format by using an event-driven machine, wherein the event-driven machine is a parser interface for an XML parser, the steps of the method being implemented by a processing machine.

2. The method of claim 1, wherein the admin lists comprises zero or more network maps and associations between the profiles present in the admin list and the one or more network maps, the association between a profile and one or more network maps defining the server(s) on which the administrative task defined by the profile needs to be performed.

3. A method for automating the execution of administrative processes in a local or a networked environment, the administrative processes comprising administrative tasks and the administrative tasks comprising administrative commands, the method comprising the steps of:
   a. creating a generic command framework in a machine-readable format that can be used to capture structures of all types of administrative commands used in the administrative processes, wherein the structures of all types of the administrative commands are captured by writing the administrative commands in accordance with the generic command framework;
   b. generating profiles that define the administrative tasks, the profiles are generated by combining all the captured administrative commands in the generic command framework in a structured mark up language, the profiles being collections of the captured administrative commands that define an administrative task, wherein the captured administrative commands when executed accomplish the administrative task;
   c. generating network maps, each network map containing details of one or more servers in the networked environment on which the administrative tasks defined by the profiles need to be performed;
   d. generating admin lists from one or more profiles and one or more network maps, each admin list being a collection of one or more profiles and one or more network maps, that define administrative tasks, which are required to be performed in a pre-defined order for executing an administrative process, wherein the admin lists comprising associations between the profiles and the one or more network maps present in the admin lists;
   e. selecting a first set of admin lists based on a selected administrative process, which is to be executed;
   f. selecting a first profile from among the one or more profiles contained in the selected first set of admin lists; and
   g. processing the selected first profile, the processing of the selected first profile comprising the steps of:
      i. parsing the selected first profile to generate XML parser events;
      ii. executing the generated XML parser events by using administered components, the administered components comprising at least one of local system devices, networked system devices, software programs and system commands, which are used to execute the generated XML parser events;
      iii. collecting messages generated by the administered components in response to execution of the generated XML parser events, the messages provide meta-data regarding the executed XML parser events;
      iv. updating the selected first profile by appending the generated messages to the selected first profile, wherein the messages are appended in a structured mark up language; and v. deciding if the updated profile needs to be processed again, the decision being made by a processing machine based on the generated messages using which the selected first profile has been updated;

if the updated profile needs to be processed again, then performing the steps of:
  a) selecting the updated profile for processing; and
  b) repeating step f for the selected first profile;

else performing the steps of:
  c) selecting next profile to be processed from the selected first set of admin lists based on the administrative tasks to be performed; and
  d) repeating step f for the selected new profile; whereby the execution of the administrative processes is automated by the automated processing of profiles that define the administrative tasks, which are required to be performed for executing the administrative processes.

4. The method of claim 3, further comprising the steps of:
  a. determining if the selected first profile needs to be transformed before processing, the transformation being required when the selected first profile needs to be converted from a first format of structured mark up language to a second format of the structured mark up language;

if the selected first profile needs to be transformed, then
  b. transforming the selected first profile from the first format to the second format using a set of pre-defined rules; and else
  c. processing the selected first profile in the first format.

5. The method of claim 3, wherein the step of executing the generated XML parser events comprises the steps of:
  a. directing the generated XML parser events to administered components using which the generated XML parser events can be executed; and
  b. executing the generated XML parser events using the administered components to which the generated XML parser events have been directed.

6. The method of claim 3, wherein the generated messages comprise control messages and system messages.

7. A system embodied on one or more processing machines in a computer network for automating the execution of administrative processes in a local or a networked environment, the administrative processes comprising administrative tasks and the administrative tasks comprising administrative commands, the system comprising:
  a. a profile generator for generating profiles by capturing the administrative commands in a structured mark up language, the profiles being collections of the captured administrative commands that define an administrative task;
  b. a network map generator for generating network maps, the network maps containing details of one or more servers in the networked environment on which the administrative commands need to be performed;
  c. an admin list generator for generating admin lists by combining one or more profiles and one or more network maps, each admin list being a collection of one or more profiles that define administrative tasks, which are required to be performed in a pre-defined order for executing an administrative process, wherein the admin lists comprising associations between the profiles and the one or more network map present in the admin list
  d. a front-end for enabling at least one function from among the functions of selecting profiles contained in admin lists, reading the selected profiles and transforming the selected profiles from a first format of structured mark up language to a second format of the structured mark up language, based on a predefined rule; and
  e. a back-end comprising:
    i. an event-driven machine for processing the selected profiles written in a structured mark up language, wherein the event-driven machine being a parser interface for XML parser; and
    ii. one or more controllers for connecting the front-end with the event-driven machine for processing the selected profiles, the controllers passing the selected profiles from the front-end to the event-driven machine.

8. The system of claim 7, wherein the event-driven machine for processing the selected profiles comprises:
  a. one or more generators, which generate events by parsing the selected profile, the one or more generators are XML parsers;
  b. one or more filters, the filters directing the generated events to administered components and causing execution of the generated events at the administered components, thereby leading to the generation of messages by the administered devices in response to the execution of the generated events; and
  c. one or more handlers, for updating the selected profile with messages generated by the administered components, the one or more handlers are XML writers.

9. The system of claim 7, wherein the administered components comprise at least one of local devices, networked devices, software programs and system commands, which are used for executing the generated events.

10. The system of claim 7, wherein the pre-defined rules are stored locally in the controller where the transformation of selected profiles is performed, or are stored outside the controller in the networked environment.

11. A computer program product for use with a computer, the computer program product comprising a computer storage medium having therein, for capturing and automating the execution of administrative processes in a local or a networked environment, the administrative processes comprising administrative tasks and the administrative tasks comprising administrative commands, the computer program product comprising:
  a. program instruction means for capturing the administrative commands in a generic command framework in a structured mark up language, the profiles being collections of the captured administrative commands that define an administrative task
  b. program instruction means for generating network maps, each network map containing details of one or more servers in the networked environment on which the captured administrative commands need to be performed;
  c. program instruction means for generating admin lists from one or more profiles and one or more network maps, each admin list being a collection of one or more profiles that define administrative tasks, which are required to be performed in a pre-defined order for executing an administrative process, wherein the admin lists comprising associations between the profiles and the one or more network map present in the admin list;
  d. program instruction means for selecting a first set of admin lists based on a selected administrative process, which is to be executed;
  e. program instruction means for selecting a first profile from among the one or more profiles contained in the selected first set of admin lists; and f. program instruction means for processing the selected first profile, the program instruction means for processing the selected first profile comprising:
  i. program instruction means for parsing the selected first profile to generate XML parser events;
  ii. program instruction means for executing the generated XML parser events by using administered components, the administered components comprising at least one of local system devices, networked system devices, software programs and system commands, which are used to execute the generated XML parser events;
  iii. program instruction means for collecting messages generated by the administered components after the execution of generated XML parser events, the messages provide meta-data regarding the executed XML parser events;
  iv. program instruction means for updating the selected first profile by appending the generated messages in a structured mark up language to the selected first profile;
  v. program instruction means for checking if the updated profile needs to be processed again; and
  vi. program instruction means for selecting the next profile contained in the selected first set of admin lists.

12. The computer program product of claim 11 further comprising a program instruction means for transforming the selected first profile before processing, the transformation being required when the selected first profile needs to be converted from a first format of structured mark up language to a second format of the structured mark up language.

13. The computer program product of claim 11, wherein the program instruction means for executing the generated XML parser events further comprises:
  a. program instruction means for directing the generated XML parser events to administered components using which the generated XML parser events can be executed; and
  b. program instruction means for causing execution of the generated XML parser events using the administered components to which the generated XML parser events have been directed.

14. A system embodied on one or more processing machines for automating the execution of administrative processes in a local or a networked environment, the administrative processes comprising administrative tasks and the administrative tasks comprising administrative commands, the system comprising:
  a. a profile generator for generating profiles by capturing the administrative commands in a generic command framework, the profiles being collections of the captured administrative commands that define an administrative task;
  b. a network map generator for generating network maps, the network maps containing details of one or more servers in the networked environment on which the captured administrative commands defining the administrative task need to be performed;
  c. an admin list generator for generating admin lists, each admin list being a collection of one or more profiles that define administrative tasks, which are required to be performed in a pre-defined order for executing an administrative process;
  d. a front-end for enabling at least one function from among the functions of selecting a profile contained in the admin lists, reading the selected profile and transforming the selected profile from one machine-readable format into second machine-readable format; and
  e. a back-end comprising:
    i. an event-driven machine for processing the selected profile written in a structured mark up language, wherein the event-driven machine being a parser interface for XML parsers, the event-driven machine further comprising:
      a) one or more generators, which generate events by parsing the selected profile, the one or more generators are XML parsers;
      b) one or more filters, the filters directing the generated events to administered components and causing execution of the generated events at the administered components, thereby leading to the generation of messages by the administered devices in response to the execution of the generated events; and
      c) one or more handlers, for updating the selected profile with the messages generated by the administered components, the one or more handlers are XML writers; and
    ii. one or more controllers for connecting the front-end with the event-driven machine for processing the selected profile, the controllers transforming the profile from one format of structured mark up language to another format, if required, based on a set of pre-defined rules and passing the selected profile from the front-end to the event-driven machine.

15. The system of claim 14, wherein the administered components comprise at least one of local devices, networked devices, software programs and system commands, which are used for executing the generated events.

* * * * *